(12) United States Patent
Nilsson et al.

(10) Patent No.: US 7,953,049 B2
(45) Date of Patent: May 31, 2011

(54) METHOD AND APPARATUS FOR ALLOCATING RECEIVER RESOURCES BASED ON DELAY

(75) Inventors: Johan Nilsson, Höllviken (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 872 days.

(21) Appl. No.: 11/876,264

(22) Filed: Oct. 22, 2007

(65) Prior Publication Data

US 2009/0103498 A1 Apr. 23, 2009

(51) Int. Cl.
H04J 3/00 (2006.01)
(52) U.S. Cl. ........................................................ 370/336
(58) Field of Classification Search .................. 370/314, 370/321, 310, 326, 337, 336, 276, 330
See application file for complete search history.

(56) References Cited

U.S. PATENT DOCUMENTS

| | | | | |
|---|---|---|---|---|
| 5,285,480 | A * | 2/1994 | Chennakeshu et al. | 375/348 |
| 7,023,798 | B2 * | 4/2006 | Bourlas et al. | 370/230 |
| 7,069,038 | B2 | 6/2006 | Hakkinen et al. | |
| 7,116,651 | B2 | 10/2006 | Hakkinen et al. | |
| 7,123,596 | B2 | 10/2006 | Fukui | |
| 2004/0042492 | A1 | 3/2004 | Suzuki et al. | |
| 2005/0003782 | A1 * | 1/2005 | Wintzell | 455/226.3 |
| 2005/0094561 | A1 | 5/2005 | Raaf | |
| 2005/0201319 | A1 | 9/2005 | Lee et al. | |
| 2005/0213575 | A1 | 9/2005 | Shin et al. | |
| 2006/0165028 | A1 | 7/2006 | Hiraki et al. | |
| 2007/0097887 | A1 * | 5/2007 | Kim et al. | 370/276 |

FOREIGN PATENT DOCUMENTS

| | | |
|---|---|---|
| WO | 2005/109705 | 11/2005 |
| WO | 2005/109725 A1 | 11/2005 |
| WO | 2005/117287 | 12/2005 |
| WO | 2007/024559 | 3/2007 |

* cited by examiner

Primary Examiner — Kwang B Yao
Assistant Examiner — Anh Ngoc Nguyen
(74) Attorney, Agent, or Firm — Coats & Bennett, P.L.L.C.

(57) ABSTRACT

Receiver resources are allocated based on how subframes are allocated within in a frame between downlink and uplink transmissions and how often the receiver is expected to report feedback information associated with the downlink transmissions. Additional time is available for processing received data blocks if the feedback information derived from those blocks must be reported later than expected due to the unavailability of uplink subframes. According to one embodiment, received signals are processed by receiving transmission configuration information indicating how downlink and uplink subframes are allocated within a frame in the time domain. Based on the transmission configuration information, the receiver determines whether a delay that exceeds a feedback reporting interval assigned to the receiver will occur when reporting feedback information associated with the downlink subframes. Receiver resources are allocated based on whether a delay will occur when reporting the feedback information.

20 Claims, 5 Drawing Sheets

METHOD AND APPARATUS FOR ALLOCATING RECEIVER RESOURCES BASED ON DELAY

BACKGROUND

The present invention generally relates to received signal processing, and particularly relates to allocating receiver resources based on the allocation of downlink and uplink resources in the time domain.

Advanced wireless communication networks such as those compatible with the Third Generation Partnership Project (3GPP) employ complex signal transmission schemes. For example, Release 8 of the Universal Mobile Telecommunications System (UMTS) is presently under development by the 3GPP Long Term Evolution (LTE) project. The proposed air interface described in Release 8 of the UMTS standard uses Orthogonal Frequency Division Multiple Access (OFDMA) for downlink transmissions (transmitter to receiver) and Single Carrier FDMA (SC-FDMA) for uplink transmissions (receiver to transmitter). Other wireless communication standards employ similar downlink and uplink transmission schemes.

Advanced downlink and uplink transmission schemes typically involve both Frequency Division Duplex (FDD) and Time Division Duplex (TDD) communication, where downlink and uplink sub-bands are separated by both a frequency offset (FDD) and a time offset (TDD). For example, with OFDMA, transmissions are divided in the time domain into time slots of duration 0.5 ms and subframes of duration 1.0 ms. Each frame is 10 ms long, and thus includes 10 subframes. Each subframe includes one or more blocks of data.

Receivers demodulate data blocks included in received downlink subframes. Receivers also report feedback information derived from the processed data to the transmitter by including the feedback information in available uplink subframes. The feedback information indicates how the receiver views the quality of the wireless communication environment. For example, a receiver conventionally reports whether blocks within a particular downlink subframe were successfully received and demodulated. Demodulation results are reported in the form of ACK/NACK reports (acknowledged/not acknowledged) which indicate whether subframes were successfully demodulated. Channel quality information may also be sent to the transmitter, e.g., in the form of a channel quality indicator (CQI) value. Other types of feedback information associated with downlink subframes may also be reported such as transmit power control information.

The transmitting device uses the feedback information to adjust the allocation of radio resources throughout the network. For example, a radio base station may allocate additional radio resources to receivers reporting a high signal quality environment, e.g., by providing a higher-order modulation scheme, increased data rate, etc. Conversely, less radio resources are allocated to receivers located in low quality environments in order to maintain an acceptable bit or symbol error rate.

Receivers are typically instructed when to report feedback information relating to downlink transmissions, e.g., N subframes after the current downlink subframe. However, the transmission configuration scheme may change within a network or between different networks. The transmission configuration scheme determines how subframes are allocated within a frame between downlink and uplink transmissions, i.e., the number of downlink and uplink subframes and when they are expected in time. For example, five downlink and five uplink subframes may be allocated for each frame. Alternatively, six downlink and four uplink subframes may be allocated per frame. Other combinations are also possible (e.g., 7/3 and 8/2). Typically, an uplink subframe must be available to report downlink feedback information.

Availability of uplink subframes depends on the current transmission configuration scheme. Fewer available uplink subframes causes a greater delay in feedback reporting when transmitting information using the TDD mode because all transmissions occur on the same carrier, i.e., uplink and downlink transmissions share the same carrier. For example, in half-duplex FDD transmission mode, an increased feedback reporting delay can occur when the user equipment cannot transmit and receive at the same time. The later an uplink subframe is available in time for reporting feedback information, the more time available for processing the corresponding downlink subframe because the feedback information generated from the downlink subframe need not be ready until just before the next uplink subframe is available. However, receivers are conventionally allocated the same fixed amount of time for processing received data blocks regardless of uplink subframe allocation. This limits receiver performance in networks where multiple transmission configuration schemes are used. Conventional receivers optimally process received data blocks for only a single transmission configuration scheme. If the density of uplink subframes changes, the receiver no longer processes received data blocks in the most efficient manner.

SUMMARY

According to the methods and apparatus taught herein, receiver resources are allocated based on how subframes are allocated within a frame between downlink and uplink transmissions and how often the receiver is expected to report feedback information associated with the downlink transmissions. How often the receiver can report the feedback information at least partially depends on the availability of uplink subframes in the time domain. It also depends on the feedback reporting interval assigned to the receiver. The feedback reporting interval determines how often the receiver is expected to report the feedback information. The receiver is provided the feedback reporting interval in advance of data communication. The receiver is also provided transmission configuration information before data communication commences which indicates the number of downlink and uplink subframes within a frame and when the subframes are available in time. This way, the receiver knows in advance how much delay can be expected when reporting feedback information.

Additional time is available for processing received data blocks if the feedback information derived from those blocks must be reported later than expected due to the unavailability of uplink subframes. The receiver makes use of such reporting delay by allocating additional receiver resources when more processing time is available. In one embodiment, additional receiver resources are allocated only to those downlink subframes for which a feedback reporting delay is expected. In another embodiment, the total feedback reporting delay for an entire frame is determined. Additional receiver resources corresponding to the total delay are allocated across all downlink subframes within the frame or a subset thereof, more evenly distributing receiver resources.

The receiver may allocate additional receiver resources based on the current transmission configuration by determining an optimal number of turbo decoder iterations. Alternatively, the receiver may determine the optimal complexity of the channel estimation algorithm used during received signal processing. In yet another embodiment, the receiver may determine the complexity of a demodulation model used during received signal processing. The receiver adapts to changes in either the transmission configuration or the feedback reporting frequency by reallocating receiver resources accordingly. This way, receiver performance remains optimized regardless of the transmission configuration.

According to one embodiment, received signals are processed by receiving transmission configuration information indicating how downlink and uplink subframes are allocated within a frame in the time domain. Based on the transmission configuration information, the receiver determines whether a delay that exceeds a feedback reporting interval assigned to the receiver will occur when reporting feedback information associated with the downlink subframes. Receiver resources are allocated based on whether a delay will occur when reporting the feedback information.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
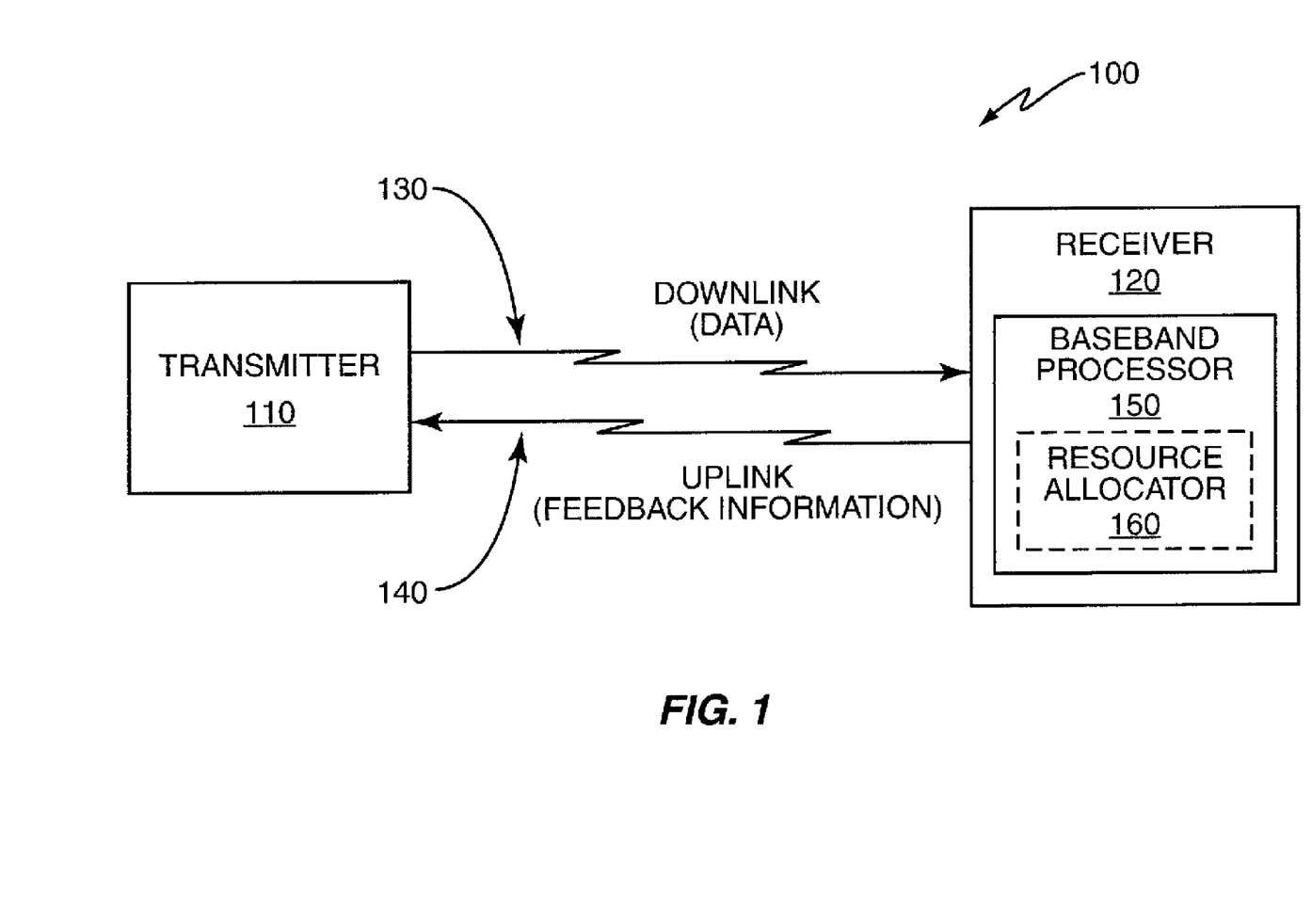
FIG. 1 is a block diagram of an embodiment of a wireless communication system including a wireless transmitter and a wireless receiver.

FIG. 1 illustrates an embodiment of a wireless communication system 100 including a wireless transmitter 110 such as a radio base station and a wireless receiver 120 such as a mobile phone or other type of mobile device. Alternatively, the transmitter 110 may be a mobile device and the receiver 120 a radio base station. Either way, data is transmitted from the transmitter 110 to the receiver 120 via one or more downlink channels 130 and the receiver 120 communicates with the transmitter 110 via one or more uplink channels 140. The transmitter 110 and receiver 120 may employ any type of FDD and TDD transmission mode, where downlink and uplink sub-bands are separated by both frequency and time offsets. Information is transmitted between the devices 110, 120 in either the uplink or downlink direction by segmenting the information into data blocks and inserting the data blocks into one or more subframes within a frame. In a purely illustrative example, the transmitter 110 and receiver 120 may support OFDMA where signal transmissions are divided in the time domain into time slots of duration 0.5 ms and subframes of duration 1.0 ms, yielding 10 subframes per frame. Of course, other frame/subframe sizes and durations may be accommodated and different modulation schemes supported such as multi-antenna modulation schemes.

Regardless, the receiver 120 processes data blocks included in received downlink subframes by demodulating and decoding the data blocks. The receiver 120 also generates feedback information based on the processed data blocks and reports the feedback information to the transmitter 110 using available uplink subframes. The feedback information provides an indication of received signal quality to the transmitter 110 and may include ACK/NACK reports, channel quality information, transmit power control information, etc. The transmitter 110 uses the feedback information to adjust its allocation of radio resources as is well known in the art, e.g., by changing modulation schemes, adjusting data rates, altering transmit power levels, etc.

However, the receiver 120 cannot always report feedback information on-time as expected because uplink subframes may not be available at the appropriate point in time. For example, the time slot needed to report feedback information on-time may be occupied by a downlink subframe. Accordingly, the receiver 120 waits for the next available uplink subframe in the time domain to report the feedback information. In some cases, the next available uplink subframe is the next regularly scheduled uplink subframe if that subframe has capacity for the feedback report. Otherwise, it is the next uplink subframe expected in time that has sufficient capacity for the feedback report. Either way, the availability of uplink subframes for reporting feedback information depends on the current transmission configuration setting. The transmission configuration setting determines how subframes are allocated within a frame in the time domain between downlink and uplink transmissions, i.e., the number of downlink and uplink subframes and when they are available in time. Conventional receivers use the same fixed amount of time for processing received data blocks regardless of the transmission configuration setting. As a result, the performance of conventional receivers is typically optimized for only a single transmission configuration setting.

If the transmission configuration setting changes, conventional receiver performance suffers. Performance suffers because the amount of time available for processing received data blocks depends on the current transmission configuration setting and how often the receiver is expected to report feedback information associated with downlink transmissions. That is, more time is available for processing received data blocks if less uplink subframes are available within in a frame because feedback information generated from the received data blocks is reported less frequently. As such, more time is available for processing the received data blocks before the feedback information must be ready for uplink transmission. To the contrary, less processing time is available if more uplink subframes are available for reporting feedback information.

Figure 2:
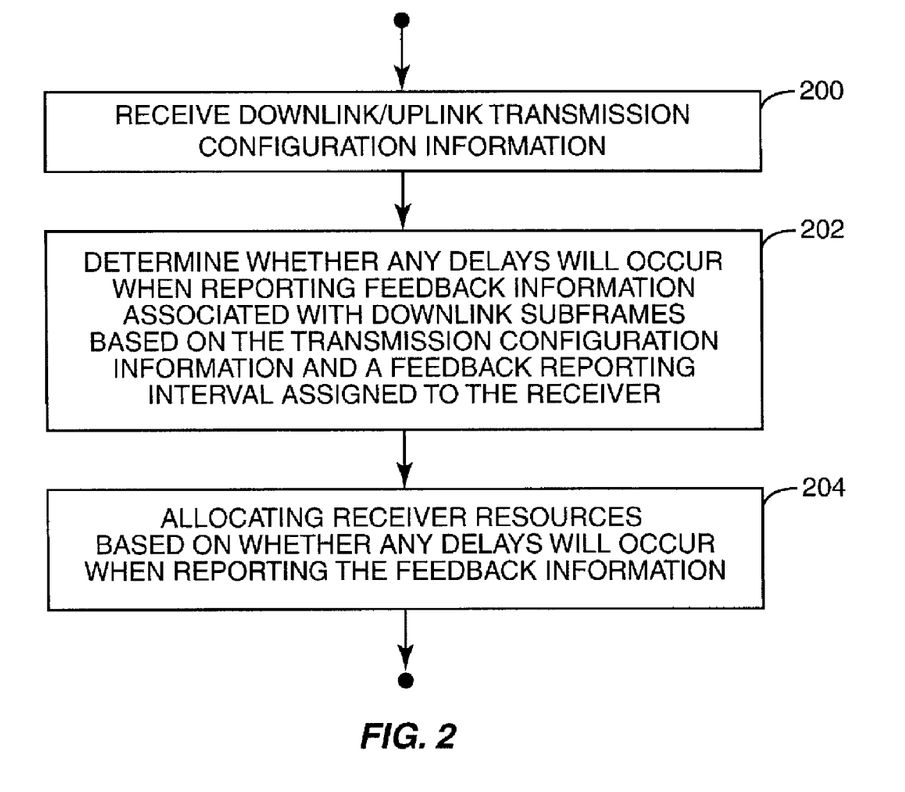
FIG. 2 is a logic flow diagram of an embodiment of processing logic for allocating receiver resources based on transmission configuration information.

The receiver 120 of the present invention optimizes its performance regardless of changes to the transmission configuration setting by leveraging the effect that the transmission configuration has on feedback reporting delay. To this end, the receiver 120 is provided transmission configuration information indicating how subframes are allocated within a frame in the time domain between downlink and uplink transmissions, e.g., as indicated by Step 200 of FIG. 2. The receiver 120 is typically provided the transmission configuration information via higher-layer signaling, e.g., during call setup. Based on the transmission configuration information, the receiver 120 determines whether a delay that exceeds a reporting interval assigned to the receiver 120 will occur when reporting feedback information associated with the downlink subframes to the transmitter 110, e.g., as illustrated by Step 202 of FIG. 2. The feedback reporting interval determines how often the receiver is expected to report the feedback information, e.g., N subframes after a downlink subframe is received. Receiver performance is optimized by allocating receiver resources based on whether a delay that exceeds the feedback reporting interval will occur when reporting the feedback information, e.g., as illustrated by Step 204 of FIG. 2. The receiver 120 advantageously utilizes its advance knowledge of the frame construct as indicated by the transmission configuration information to allocate receiver resources before downlink subframes begin to arrive at the receiver 120. Received data blocks are then processed using the allocated resources by demodulating and decoding the received data blocks.

In one embodiment, the number of turbo decoder iterations is determined based on the current transmission configuration setting and the feedback reporting interval assigned to the receiver 120. In another embodiment, the complexity of the channel estimation algorithm employed during data block processing is determined based on the current transmission configuration setting and feedback reporting interval. In yet another embodiment, the complexity of the demodulation model employed during data block processing is determined based on the current transmission configuration setting and feedback reporting interval.

Each of these embodiments, taken alone or in different combinations, optimizes receiver performance regardless of the transmission configuration because receiver resources are allocated based on the time available for processing received data blocks before feedback information must be ready for uplink transmission. Received data blocks are more likely to be successfully demodulated and decoded when uplink subframe availability permits allocation of additional receiver resources. Receiver resources are reduced, on the other hand, when uplink subframe density increases. Thus, receiver performance is optimized regardless of changes to the transmission configuration.

Turning to the wireless receiver 120 in more detail, a baseband processor 150 processes data blocks included in received downlink subframes by demodulating and decoding the data blocks. The baseband processor 150 also generates feedback information based on the processed data blocks and sends the feedback information to the transmitter 110 by inserting the feedback information in available uplink subframes. A resource allocator 160 included in or associated with the baseband processor 150 determines whether a delay that exceeds the feedback reporting interval assigned to the receiver 120 will occur when the receiver 120 reports feedback information associated with the downlink subframes. This determination is based on the current transmission configuration information. The resource allocator 160 also allocates receiver resources for processing the received data blocks based on whether any delay will occur when reporting the feedback information. Receiver resources may be reallocated in response to newly received configuration information and/or if a different feedback reporting interval is assigned to the receiver 120.

Figure 3:
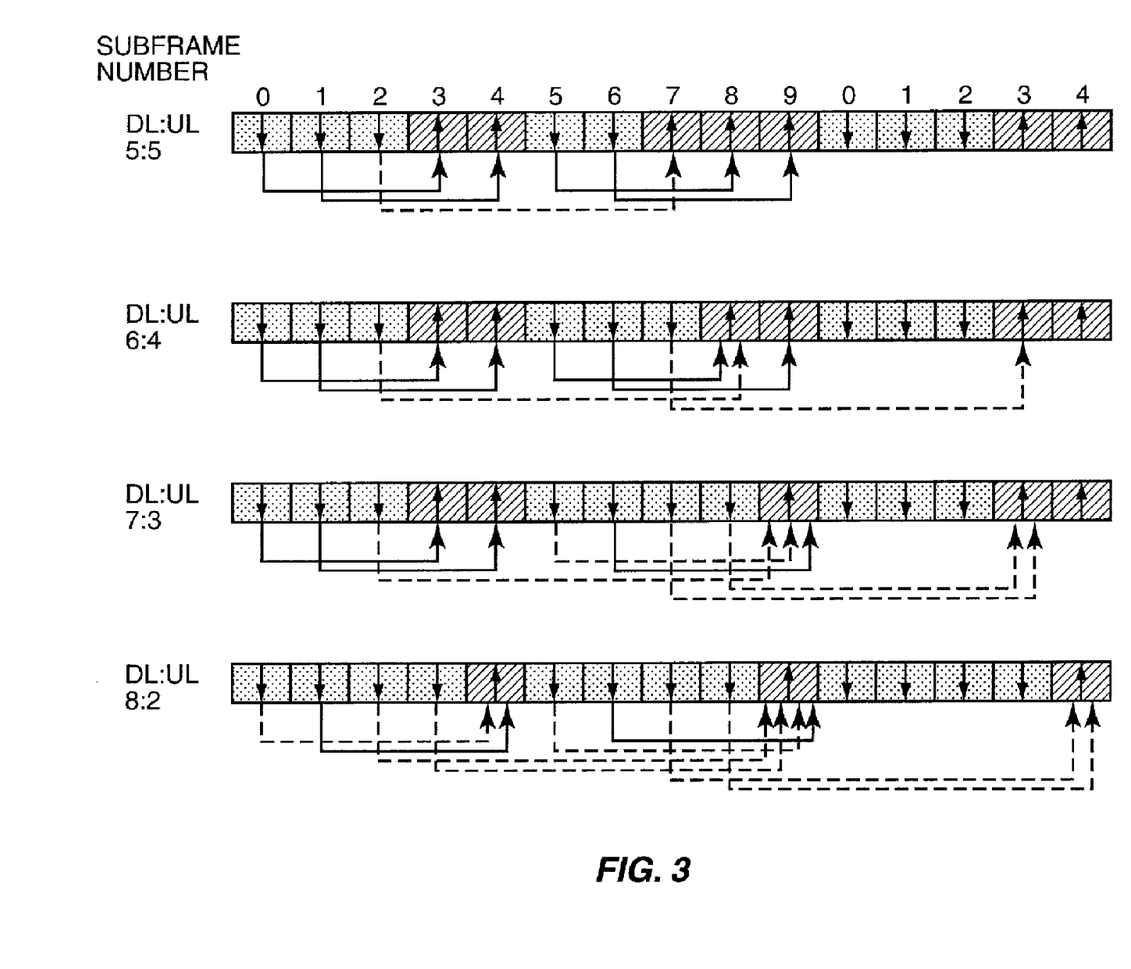
FIG. 3 is a block diagram of exemplary transmission configurations.

Operation of the receiver 120 is described next with reference to four exemplary transmission configuration settings shown in FIG. 3. The exemplary transmission configuration settings of FIG. 3 are based on the OFDM frame structure and provided for ease of explanation only. They should not be considered limiting in any way. Of course, other modulation schemes having different frame/subframe constructs may be accommodated. With this understanding, the first transmission configuration setting directs the receiver 120 to expect five downlink and five uplink subframes per frame (5:5 DL/UL transmission configuration setting). The first three subframes (subframes 0-2) are downlink subframes followed by two uplink subframes (subframes 3-4). Next are two additional downlink subframes (subframes 5-6) followed by three successive uplink subframes (subframes 7-9), completing the frame.

In FIG. 3, the receiver 120 is also expected to report feedback information derived from each downlink subframe three subframes in time after the downlink subframe was received. Of course, the receiver 120 may be expected to report the feedback information at other subframe intervals. Returning to the 5:5 DL/UL configuration example shown in FIG. 3, feedback information associated with the first downlink subframe (subframe 0) can be transmitted on-time because an uplink subframe is available three subframes later (subframe 3) as indicated by the solid line extending from subframe 0 to subframe 3. Likewise, feedback information associated with the second downlink subframe (subframe 1) can also be reported on-time because an uplink subframe is available three subframes later (subframe 4) as indicated by the solid line extending from subframe 1 to subframe 4.

However, feedback information associated with the third downlink subframe (subframe 2) cannot be reported on-time because the next uplink subframe is available four subframes later in time (subframe 7) instead of three as indicated by the dashed line extending from subframe 2 to subframe 7. The receiver 120 utilizes this reporting delay by allocating additional receiver resources for processing received data blocks. In one embodiment, nominal receiver resources are allocated to all downlink subframes for which the receiver 120 is expected to report feedback information on-time (i.e., the first, second, fourth and fifth downlink subframes in the 5:5 DL/UL configuration example shown in FIG. 3). Additional receiver resources are allocated only to the downlink subframes for which a delay in feedback reporting is expected (i.e., the third downlink subframe in the 5:5 DL/UL configuration example shown in FIG. 3).

According to this embodiment, the feedback reporting delay associated with a particular downlink subframe corresponds to the number of successive downlink subframes scheduled between when the receiver 120 is expected to report the feedback information associated with that downlink subframe and when the next uplink subframe is available in the time domain. Based on the 5:5 DL/UL configuration example shown in FIG. 3, additional receiver resources corresponding to two downlink subframes can be allocated for processing the third downlink subframe. This corresponds to approximately 2.0 ms of additional data block processing time for OFDM frames. Two subframes worth of additional receiver resources may be allocated for processing the third downlink subframe because downlink subframes 5 and 6 are scheduled in the time domain between when the receiver 120 is expected to report the corresponding feedback information during subframe 5 and when the next uplink subframe (subframe 7) is available in the time domain.

According to another embodiment, receiver resources are allocated by determining a total delay associated with reporting the feedback information for all downlink subframes in a frame. Receiver resources are then allocated equally across all of the downlink subframes or a subset thereof based on the total reporting delay. Again considering the 5:5 DL/UL configuration example shown in FIG. 3, a total reporting delay of two subframes will be incurred for the entire frame. The two subframe delay corresponds to the delay incurred by the receiver 120 in reporting feedback information associated with the third downlink subframe as previously explained. Receiver resources are then allocated equally across all five downlink subframes or a subset of the five downlink subframes based on the two subframe total reporting delay.

FIG. 3 illustrates other exemplary transmission configuration settings. The second transmission configuration setting directs the receiver 120 to expect six downlink and four uplink subframes per frame (6:4 DL/UL configuration). The first three subframes are downlink subframes followed by two successive uplink subframes. The next three subframes are also downlink subframes followed by two additional successive uplink subframes, completing the frame. For ease of explanation only, assume once again that the receiver 120 is expected to report feedback information three subframes in time after receiving a downlink subframe. Accordingly, the receiver 120 will report feedback information associated with both the third downlink subframe (subframe 2) and sixth downlink subframe (subframe 7) three subframes in time later than expected. The receiver 120 utilizes its advance knowledge of this expected reporting delay by further processing received data blocks. According to the first embodiment previously described herein, three subframes worth of additional receiver resources are allocated only to both the third and sixth downlink subframes. This way, data blocks included in the third and sixth downlink subframes receive additional processing. According to the second embodiment previously described herein, the total reporting delay of six subframes (three subframe delay for the third downlink subframe and three subframe delay for the sixth downlink subframe) is equally applied across all six downlink subframes or a subset thereof so that additional receiver resources are allocated more evenly across the entire downlink transmission.

The third transmission configuration setting shown in FIG. 3 directs the receiver 120 to expect seven downlink and three uplink subframes per frame (7:3 DL/UL configuration). The fourth transmission configuration setting directs the receiver 120 to expect eight downlink and two uplink subframes per frame. Again, the receiver 120 utilizes its advance knowledge of the expected reporting delay by allocating additional receiver resources to either only the downlink subframes for which a reporting delay is expected or evenly across all downlink subframes or a subset thereof based on the total reporting delay, both embodiments as previously described herein. This way, the receiver performance is optimized regardless of the transmission configuration by adaptively allocating receiver resources based on the current transmission configuration setting instead of allocating the same fixed amount of receiver resources for all configurations.

Figure 4:
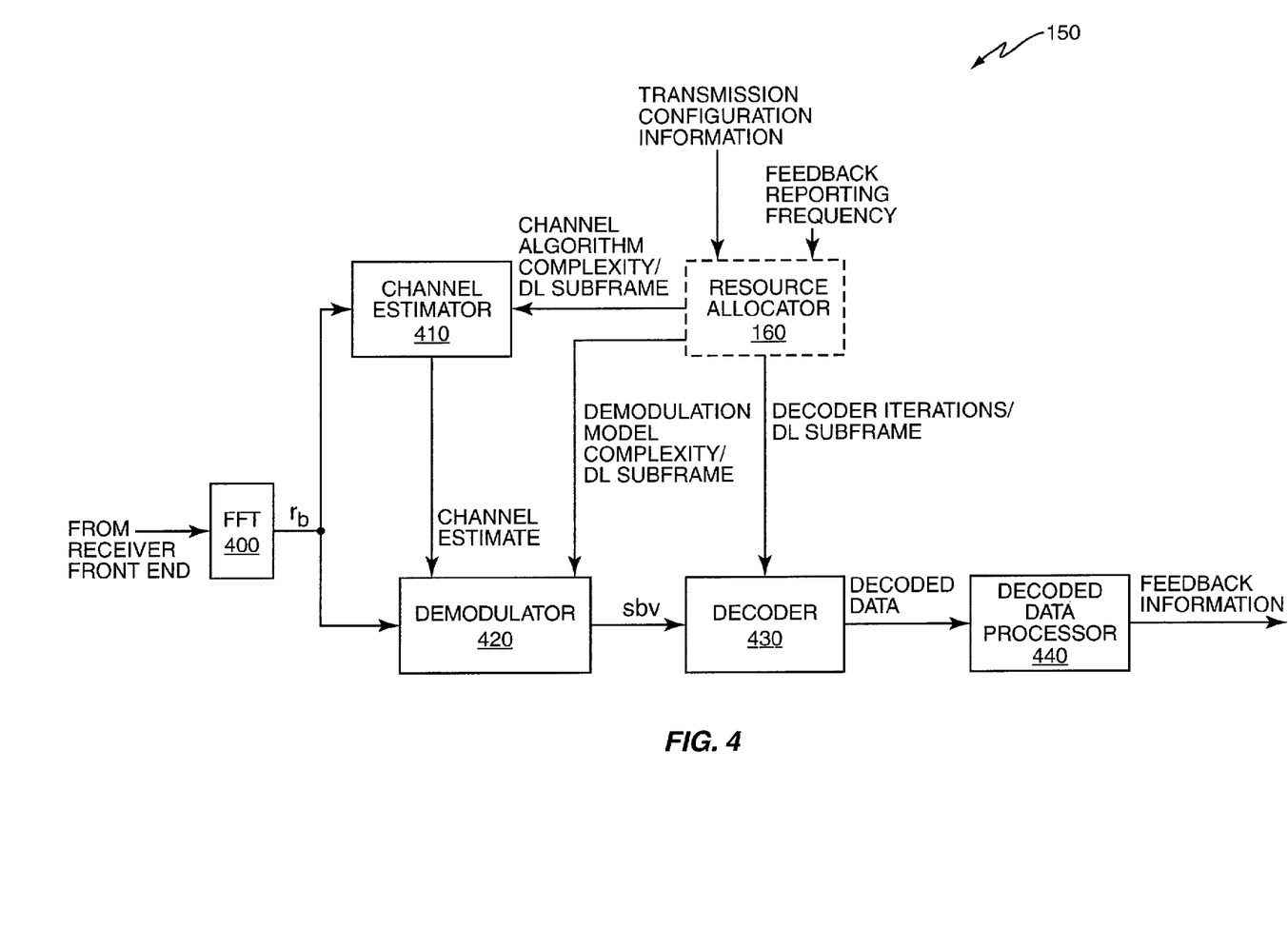
FIG. 4 is a block diagram of an embodiment of a baseband processor operable to allocate receiver resources based on transmission configuration information.

FIG. 4 illustrates an OFDM embodiment of the baseband processor 150 included in the wireless receiver 120. The baseband processor 150 includes a Fast Fourier Transform (FFT) block 400 for transforming time domain discrete signals provided by the receiver front end circuitry (not shown) to frequency domain discrete signals. The baseband signal $r_b$ output by the FFT block 400 is fed to both a channel estimator 410 and a demodulator 420. The channel estimator 410 derives an estimate of the channel over which signals are received from the transmitter 110, e.g., based on pilot signals embedded in received data blocks as is well known in the art. The demodulator 420 generates soft bit values (sbv) or symbol estimates from the baseband signal $r_b$ based on a selected set of demodulation processing delays and corresponding combining weights as is well known in the art.

The resulting soft bit values are decoded, e.g., by a turbo decoder 430 as is well known in the art. The decoded data is then processed by a decoded data processor 440. The decoded data processor 440 generates feedback information such as ACK/NACK reports, channel quality information, transmit power control information, etc. based on the decoded data as is well known in the art. The baseband processor 150 periodically encodes and modulates the feedback information for uplink transmission to the transmitter 110. The encoded and modulated feedback information is inserted into uplink subframes as they become available.

Figure 5:
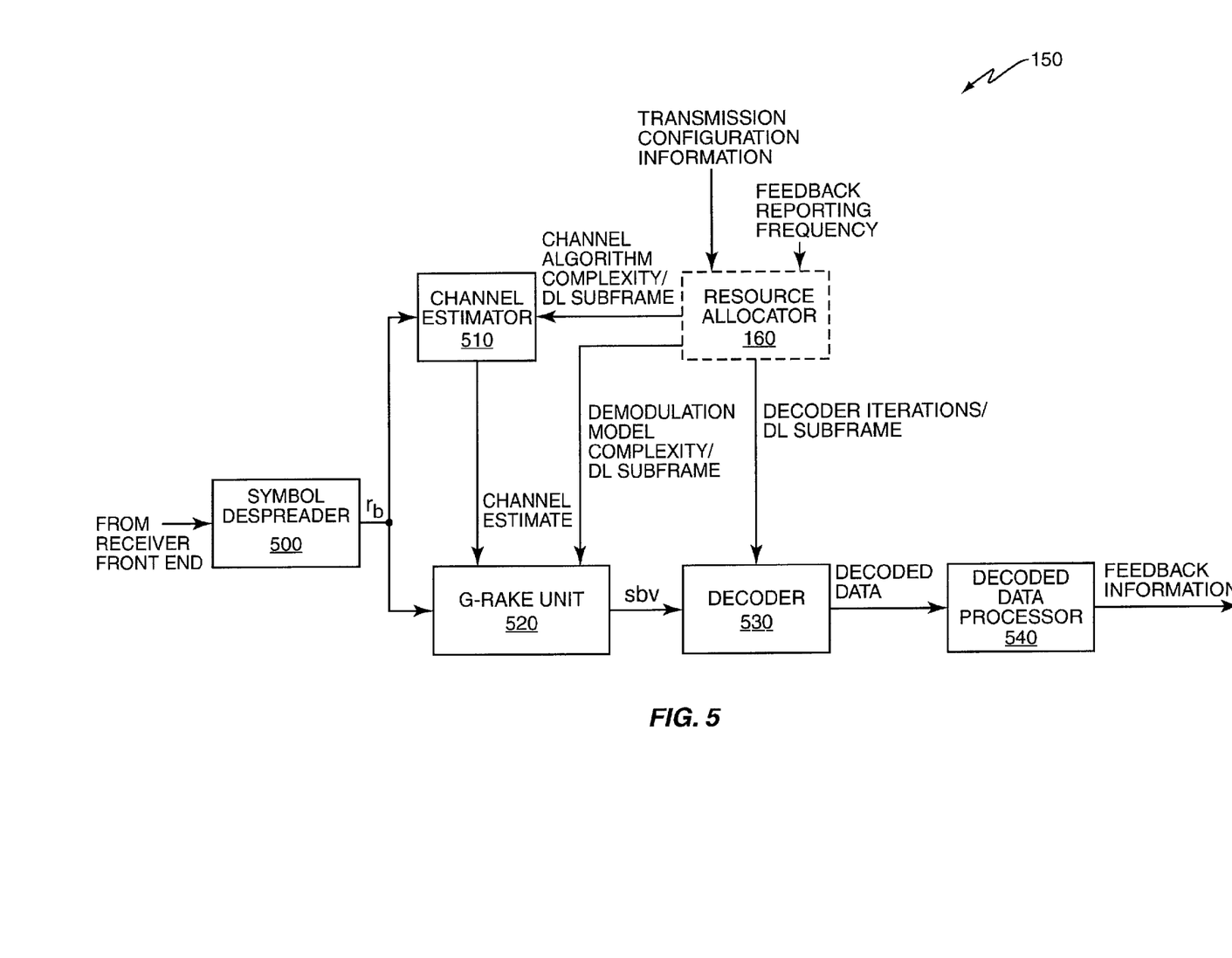
FIG. 5 is a block diagram of another embodiment of a baseband processor operable to allocate receiver resources based on transmission configuration information.

FIG. 5 illustrates a Wideband-CDMA (WCDMA) embodiment of the baseband processor 150. A symbol de-spreader 500 despreads received symbols. In one embodiment, the symbol de-spreader 500 includes a plurality of correlator fingers for despreading one or more traffic channels using a set of processing delays and a corresponding spreading code sequence. The correlator fingers may comprise one or more of traffic channel fingers, pilot channel fingers and probing fingers which may be real or virtual, i.e., mathematically derived. Each correlator finger has an associated delay and a spreading waveform correlator. The correlator fingers generate despread values using the received data blocks and the spreading code sequence. The despread symbols $r_b$ are fed to both a channel estimator 510 and a G-RAKE unit 520. The channel estimator 510 derives an estimate of the channel over which signals are received from the transmitter 110, e.g., based on despread pilot symbols as is well known in the art. The G-RAKE unit 520 combines the despread values to yield soft bit values (sbv) or symbol estimates using combining weights derived from the channel and noise estimates.

Alternatively, the baseband processor 150 is of the chip equalizer type instead of the G-RAKE type. According to this embodiment, the symbol de-spreader 500 is replaced by an equalization Finite Impulse Response (FIR) filter (not shown) which processes received data blocks using a set of equalization filter tap delays. Each filter tap is weighted using a corresponding weight. The FIR output is fed to the channel estimator 510 and to a RAKE unit (not shown) instead of the G-RAKE unit 520. The RAKE unit yields soft bit values (sbv) or symbol estimates by despreading the filtered values using a corresponding spreading code sequence.

In either the G-RAKE or chip equalizer embodiment, the resulting soft bit values are decoded, e.g., by a turbo decoder 530 as is well known in the art. The decoded data is then processed by a decoded data processor 540. The decoded data processor 540 generates feedback information such as ACK/NACK reports, channel quality information, transmit power control information, etc. based on the decoded data as is well known in the art. The baseband processor 150 periodically encodes and modulates the feedback information for uplink transmission to the transmitter 110. The encoded and modulated feedback information is inserted into uplink subframes as they become available.

As discussed previously herein, not all feedback information can be reported on-time by the receiver 120. Whether feedback information is reported on-time depends on the current transmission configuration setting and how often the receiver 120 is expected to report feedback information. The resource allocator 160 processes the current transmission configuration setting and the feedback reporting interval assigned to the receiver 120 to determine the optimum allocation of receiver resources.

In one embodiment, the resource allocator 160 determines the optimal number of turbo decoder iterations. This optimum number of decoder iterations is provided to the decoder 430/530 along with the current downlink subframe index (DL subframe) to indicate which subframe is currently being processed. This way, if more time is available for processing received data blocks, additional turbo decoder iterations are permitted. Additional turbo decoder iterations may be allocated only to those downlink subframes for which feedback reporting will be delayed. Alternatively, the total feedback reporting delay associated with a frame may be determined. Additional turbo decoder iterations corresponding to the total reporting delay can then be averaged across all or a subset of the downlink subframes. Either way, decoding accuracy improves when more time is available for processing received data blocks.

In another embodiment, the resource allocator 160 determines the optimal complexity of the channel estimation algorithm used by the channel estimator 410/510. In one embodiment, channel model accuracy can be improved if more processing time is available by post-processing the channel estimate using a channel estimation filter (CEF) such as a linear minimum mean-squared error (MMSE) filter. Alternatively, the channel model may include additional correlator fingers when the demodulator is a G-RAKE or filter taps when the demodulator is a chip equalizer. In yet another embodiment, the channel estimation process may be iterative where a number of successive calculations are performed to determine the channel estimate. Channel estimation algorithm complexity can be modified by altering the number of iterations. Optimizing complexity of the algorithm based on the current transmission configuration setting and the feedback reporting interval assigned to the receiver 120 improves the accuracy of the resulting channel estimate, thus increasing demodulation accuracy.

In yet another embodiment, the resource allocator 160 determines the optimal complexity of the demodulation model employed by the demodulator 420/G-RAKE unit 520. In one embodiment, the complexity of the demodulation model is increased when additional processing time is available by employing a successive interference cancellation scheme if the receiver 120 is adapted for multiple-input, multiple-output (MIMO) communication. If less processing time is available as determined by the resource allocator 160, a less complex demodulation model is employed such as a least-squares model. In another embodiment, the demodulation process may be iterative where a number of successive calculations are performed when demodulating received data blocks. The demodulation model complexity may be modified by altering the number of iterations. Optimizing demodulation model complexity based on the current transmission configuration setting and the feedback reporting interval assigned to the receiver 120 improves demodulation accuracy, thus reducing the overall bit or symbol error rate.

As explained previously herein, the resource allocator 160 alters the complexity of the channel estimator 410/510, demodulator 420/G-RAKE unit 520 and/or decoder 430/530 based on the current transmission configuration setting and the feedback reporting interval assigned to the receiver 120. This way, receiver performance remains optimized regardless of changes to the transmission configuration setting and/or feedback reporting interval. If either parameter changes, the resource allocator 160 readjusts the receiver resources accordingly, e.g., by modifying the complexity of the channel estimator 410/510, demodulator 420/G-RAKE unit 520 and/or decoder 430/530.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. In a wireless receiver, a method of processing received signals comprising:
    receiving transmission configuration information indicating how downlink and uplink subframes are allocated within a frame in a time domain;
    determining, based on the transmission configuration information, whether a delay that exceeds a feedback reporting interval assigned to the receiver will occur when reporting feedback information associated with the downlink subframes; and
    allocating receiver resources based on whether the delay will occur when reporting the feedback information by allocating nominal receiver resources to the downlink subframes for which the receiver is expected to report feedback information on-time in an uplink subframe and allocating additional receiver resources to the downlink subframes for which the receiver is not expected to report the feedback information on-time.

2. The method of claim 1, wherein determining whether the delay will occur when reporting the feedback information comprises, for each downlink subframe, determining whether the uplink subframe will be available in the time domain before the feedback reporting interval expires for reporting the feedback information associated with the downlink subframes.

3. The method of claim 1, wherein allocating additional receiver resources comprises, for each downlink subframe for which the receiver is not expected to report feedback information on-time, allocating an amount of additional receiver resources corresponding to the number of successive downlink subframes scheduled between when the receiver is expected to report the feedback information and when the next uplink subframe is available in the time domain.

4. The method of claim 1, wherein allocating the receiver resources based on whether the delay will occur when reporting the feedback information comprises allocating additional receiver resources across all of the downlink subframes or a subset thereof based on a total reporting delay associated with reporting the feedback information for all of the downlink subframes.

5. The method of claim 1, wherein allocating the receiver resources based on whether the delay will occur when reporting the feedback information comprises determining a number of turbo decoder iterations based on whether the delay will occur when reporting the feedback information.

6. The method of claim 1, wherein allocating the receiver resources based on whether the delay will occur when reporting the feedback information comprises determining a complexity of a channel estimation algorithm used during received signal processing based on whether the delay will occur when reporting the feedback information.

7. The method of claim 1, wherein allocating the receiver resources based on whether the delay will occur when reporting the feedback information comprises determining a complexity of a demodulation model used during received signal processing based on whether the delay will occur when reporting the feedback information.

8. The method of claim 1, further comprising:
    demodulating data blocks included in received downlink subframes using the allocated receiver resources;
    generating feedback information for each downlink subframe based on the corresponding demodulation results; and
    reporting the feedback information as one or more uplink subframes become available.

9. The method of claim 1, wherein the feedback information comprises one or more of ACK/NACK reports, channel quality information, and transmit power control information.

10. The method of claim 1, further comprising reallocating the receiver resources based on newly received transmission configuration information and/or if a different feedback reporting interval is assigned to the receiver.

11. A wireless receiver comprising a baseband processor configured to: process transmission configuration information indicating how downlink and uplink subframes are allocated within a frame in a time domain;
  determine, based on the transmission configuration information, whether a delay that exceeds a feedback reporting interval assigned to the receiver will occur when reporting feedback information associated with the downlink subframes; and
  allocate receiver resources based on whether the delay will occur when reporting the feedback information by allocating nominal receiver resources to the downlink subframes for which the receiver is expected to report feedback information on-time in an uplink subframe and allocating additional receiver resources to the downlink subframes for which the receiver is not expected to report the feedback information on-time.

12. The wireless receiver of claim 11, wherein for each downlink subframe, the baseband processor is configured to determine whether an uplink subframe will be available in the time domain before the feedback reporting interval expires for reporting the feedback information associated with the downlink subframe.

13. The wireless receiver of claim 11, wherein for each downlink subframe for which the receiver is not expected to report feedback information on-time, the baseband processor is configured to allocate an amount of additional receiver resources corresponding to the number of successive downlink subframes scheduled between when the receiver is expected to report the feedback information and when the next uplink subframe is available in the time domain.

14. The wireless receiver of claim 11, wherein the baseband processor is configured to allocate additional receiver resources across all of the downlink subframes or a subset thereof based on a total reporting delay associated with reporting the feedback information for all of the downlink subframes.

15. The wireless receiver of claim 11, wherein the baseband processor is configured to determine a number of turbo decoder iterations based on whether the delay will occur when reporting the feedback information.

16. The wireless receiver of claim 11, wherein the baseband processor is configured to determine a complexity of a channel estimation algorithm used during received signal processing based on whether the delay will occur when reporting the feedback information.

17. The wireless receiver of claim 11, wherein the baseband processor is configured to determine a complexity of a demodulation model used during received signal processing based on whether the delay will occur when reporting the feedback information.

18. The wireless receiver of claim 11, wherein the baseband processor is configured to:
  demodulate data blocks included in received downlink subframes using the allocated receiver resources;
  generate feedback information for each downlink subframe based on the corresponding demodulation results; and
  report the feedback information as one or more uplink subframes become available.

19. The wireless receiver of claim 11, wherein the feedback information comprises one or more of ACK/NACK reports, channel quality information, and transmit power control information.

20. The wireless receiver of claim 11, wherein the baseband processor is configured to reallocate the receiver resources based on newly received transmission configuration information and/or if a different feedback reporting interval is assigned to the receiver.

* * * * *